Aug. 30, 1955 W. S. BACHMAN 2,716,551

RECORD CUTTING STYLUS SUSPENSION

Filed Feb. 17, 1951 2 Sheets-Sheet 1

INVENTOR
WILLIAM S. BACHMAN
BY
Pennie, Edmonds, Morton, Barrows and Taylor
ATTORNEYS Aug. 30, 1955 W. S. BACHMAN 2,716,551

RECORD CUTTING STYLUS SUSPENSION

Filed Feb. 17, 1951 2 Sheets-Sheet 2

INVENTOR
WILLIAM S. BACHMAN
BY
Pennie, Edmonds, Morton, Barrows and Taylor
ATTORNEYS 2,716,551
Patented Aug. 30, 1955

2,716,551

RECORD CUTTING STYLUS SUSPENSION

William S. Bachman, Southport, Conn., assignor, by mesne assignments, to Columbia Broadcasting System, Inc., New York, N. Y., a corporation of New York Application February 17, 1951, Serial No. 211,558
4 Claims. (Cl. 274—24)

This invention relates to sound recording machines employing a stylus to cut a sound groove in a record medium, and more particularly to an improved suspension for the sound groove cutting stylus and its associated drive mechanism, adapted to insure the cutting of grooves of substantially uniform depth.

The invention provides a suspension or "float" which is connected to the surface of the record medium (usually a disk) in the vicinity of the contact point between the stylus and record via a coupling which includes an element of mechanical resistance. This coupling is therefore mechanically in parallel with that provided by the stylus. The mechanical resistance of the coupling so provided damps out the oscillations which would otherwise occur in the cutting head suspension due to irregularities in the surface of the record blank being cut. The mass of the suspension forms with the compliance between the record and stylus a resonant system which without such damping will oscillate at its characteristic frequency when suitably excited, as it will be by irregularities in the record surface of suitable shape and spacing.

In the cutting of sound records it is important to make the depth of the grooves as nearly constant as possible. The surfaces of the record blanks or disks employed for sound recording by the cutting of grooves therein are not perfectly plane, and when mounted upon the turntable of a record cutting lathe the disks may not rotate true, for example if they are thicker along one end of a diameter than the other. To permit the cutting of grooves of uniform depth the cutting head is customarily suspended for rotation about a horizontal axis, pemitting the head to follow undulations of the surface being cut in order to produce grooves of uniform depth. However, since the cutting head and its suspension possess mass, they do not respond instantaneously to variations in the record surface, and variations in groove depth therefore occur.

To produce grooves of uniform depth it has been proposed heretofore to counterweight the cutting head on a lever extending beyond the horizontal pivot about which the cutting head rotates. By means of such counterweights it is possible to adjust the net downward gravitational force at the cutting stylus to a suitable value. The pivot is located above and to the rear of the stylus, in the sense of the stylus-record motion. In cutting, the record exerts a horizontal force on the stylus, which increases with the depth of the cut. This force exerts a turning moment on the suspension about its pivot, tending to lift the stylus to shallower cuts. Since the cutting head is not completely counter-balanced there exists a net gravitational force at the stylus which gives rise to an opposing moment and the stylus will ride at the depth for which balance exists between the two moments. By proper adjustment of the counter-weights, the moment due to gravity may be brought to a value which will establish equilibrium at a desired cutting depth and this depth will be held by the stylus in spite of irregularities in the record surface, provided these are of low frequency such as those due to irregularities in the thickness of the record being cut on opposite ends of a diameter.

However, the effective mass of the suspension, referred to the stylus tip, forms with the compliance between the stylus and the record a mechanical system capable of oscillations which will respond to sudden surface discontinuities. Such abrupt discontinuities excite the resonant frequency of this system. The resultant oscillations, referred to in the art as "cutter bounce" leave a moire pattern on the cut record. This affects undesirably the appearance of the resultant master or instantaneous record and of its derivative pressings and may interfere with satisfactory tracking of the reproducer stylus on the playback of such derivative records. The counterweighted suspension is therefore satisfactory as regards the low frequency changes in height of the record surface, but not as to the high frequency changes caused by abrupt discontinuities.

In order to cut grooves of uniform depth it has also been proposed to provide between the cutting head and the record surface a sliding shoe or "advance ball" attached to the cutting head or to the suspension. As before the cutting head is mounted on a lever pivoted about a horizontal axis, but the lever is weighted to bear down on the advance ball, keeping it in contact with the record surface. The advance ball, rigidly connected to the suspension lever, rides on the uncut surface of the record blank and, in general, prevents the stylus from penetrating beyond the chosen depth. It also prevents the suspension from oscillating, so that the system is free from "cutter bounce." However the advance ball cannot contact the record at the same point as the stylus so that if the record blank is not flat or does not rotate true about the axis of the turntable the variations in height of the record surface presented to the advance ball are not the same as those occurring at the stylus position, and variations in groove depth will result.

Such variations in groove depth, of a frequency of the same order as the speed of rotation of the disk, are not serious when the groove pitch is of the order of 80–100 lines per inch. However with pitches 100–300 lines per inch as now employed, the lands between adjacent grooves are so narrow that even minor variations in groove depth are objectionable and may prevent proper tracking of the reproducing stylus on playback. The rigid advance ball is not therefore satisfactory.

It has also been proposed, as in Patent No. 1,283,771 to Holland, to provide an advance ball elastically connected to the cutting head by means of springs. The addition of such a spring alters the total effective compliance between the stylus and the record but does not change the oscillatory character of the system which this compliance and the cutting head mass provide. Consequently the principal advantage of the rigid advance ball is lost.

According to the present invention instead, the advance ball is linked to the cutting head or float through a coupling which includes a mechanical resistance, preferably in the form of a bearing containing a highly viscous lubricant. To maintain the advance ball in contact with the record, it is in a preferred embodiment weighted separately. The resulting suspension responds to low frequency variations in the height of the record surface in the same way as the counterweighted suspensions of the prior art. The advance ball slowly shifts relative to the float as required by variations in the relation of the record surface to the float at the position of the advance ball, without imposing large forces on the float, and a constant cutting depth is maintained by a balance of forces at the stylus. As to high frequency irregularities the structure behaves like the suspension of the prior art having an advance ball rigidly connected to the suspension. The resistive coupling appears stiff to high frequency irregularities, compelling the stylus to follow the advance ball, and at the same time the oscillations of the suspension which would otherwise be caused by such irregularities are damped out by the small motions which take place at the resistive element in the coupling.

The invention will be better understood from the following detailed description of a preferred embodiment thereof, taken in conjunction with the accompanying drawings in which Fig. 1 is a perspective view of a suspension according to the invention, shown in operative relation with a master record being cut.

Figure 1:
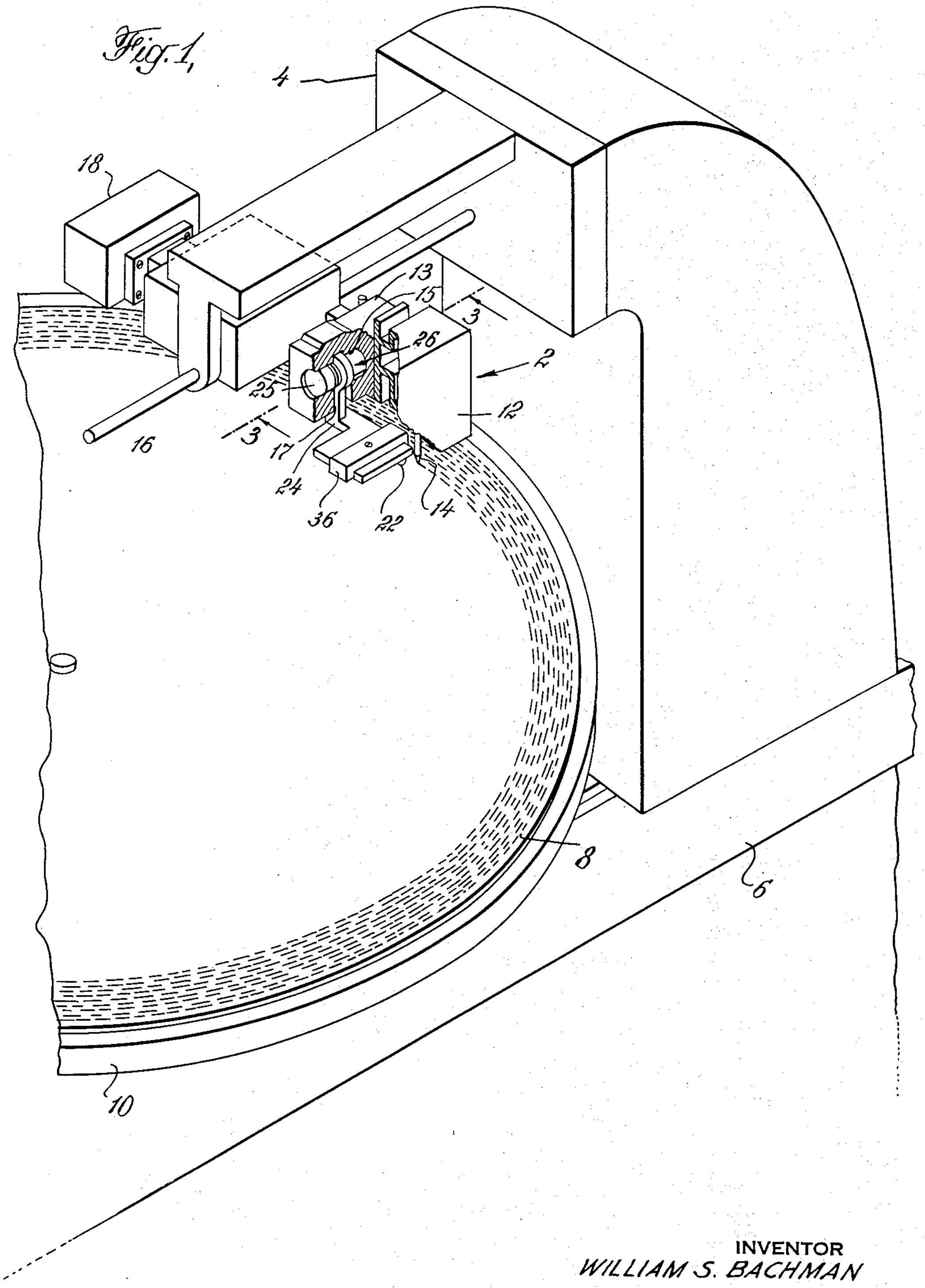

In Fig. 1 a cutting stylus suspension or float according to the invention is indicated generally at 2. The float is shown supported from the carriage 4 of a record cutting lathe 6. The record blank 8 being cut is rotated on a turntable 10, and the carriage is advanced radially over the turntable by a suitable lead screw mechanism not shown.

The suspension includes a cutting head 12 which transforms electrical signals representative of the sounds to be recorded into vibrations of the cutting stylus 14. The head 12 is affixed to a lever 13, journaled on a shaft 16 in the carriage so as to rotate in a vertical plane. The suspension may be provided with suitable means for locking it in a retracted position. A counterweight 18 at the back end of the lever provides an approximate balance for the suspension about the shaft 16. An advance ball 22 having a smooth gently rounded surface contacts the record in the close vicinity of the stylus 14 and is supported from an advance ball arm 24. The advance ball arm is affixed to a shaft which rotates in a bearing generally indicated at 26 in the lever 13. As further described below the bearing 26 is lubricated with high viscosity oil so that rotation of the advance ball arm with respect to the suspension requires the expenditure of energy.

The advance ball is weighted by means of a mass 36 affixed to the arm 24. The weight 36 provides a force of gravity to keep the advance ball in contact with the record disk. The amount of this weight is not critical, providing it exceeds the minimum necessary to maintain contact between the record surface and ball despite irregularities in the former. Unless contact is so maintained, the forces due to incipient oscillations of the suspension will not be transmitted to the viscous coupling at the bearing 26 and the resistance thereof will not play its proper part in damping out such oscillations.

Figures 2, 3, 4, 5:
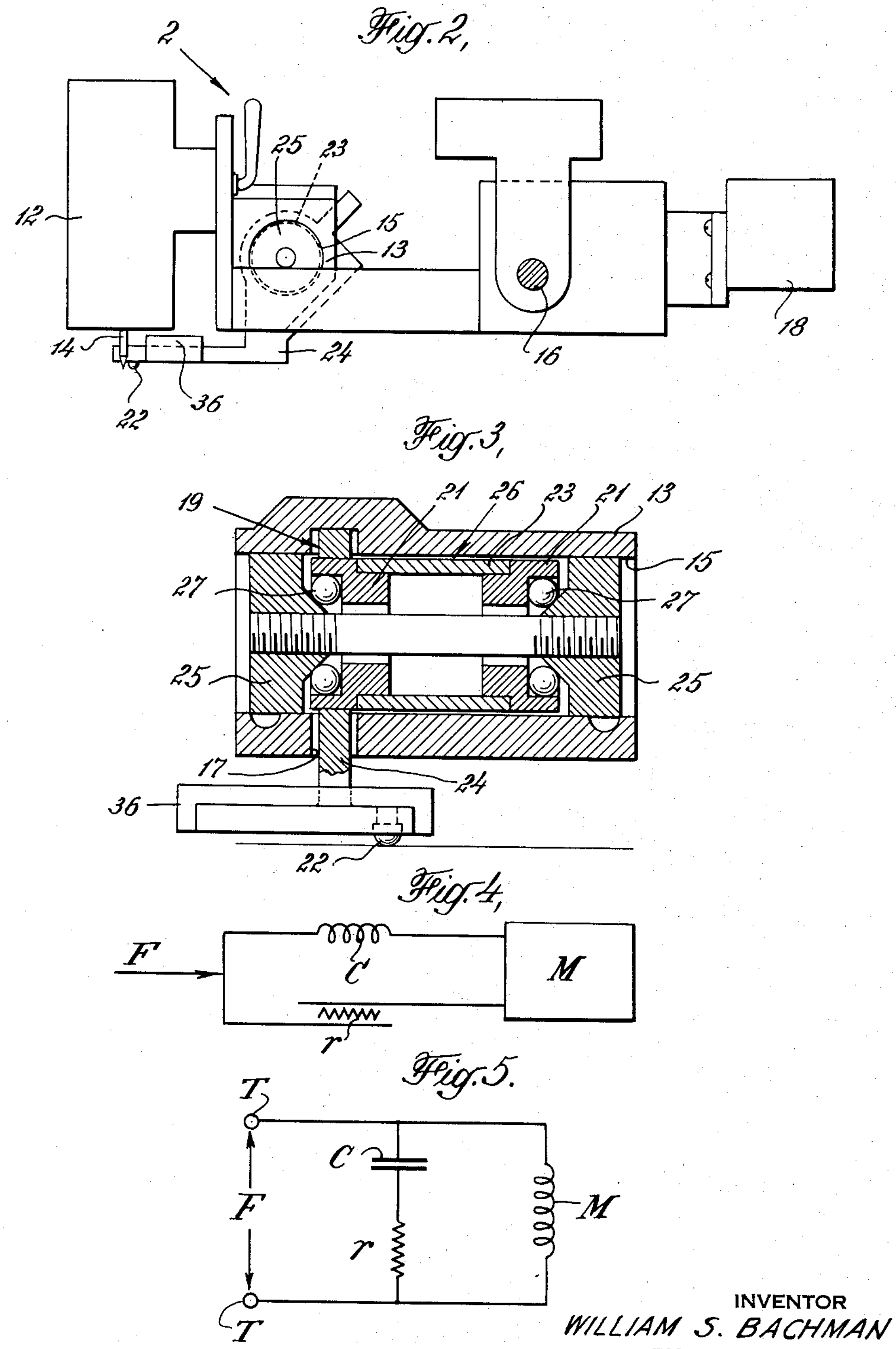
Fig. 2 is a side elevation of the suspension of Fig. 1.
Fig. 3 is a sectional view of the viscous damping element in the suspension of Fig. 1, taken along the line 3—3 of that figure.
Fig. 4 is a schematic diagram illustrating the mechanical components in the suspension of Fig. 1.
Fig. 5 is a diagram of an electrical circuit equivalent to the mechanical circuit of Fig. 4.

As seen in Fig. 2 the advance ball and stylus contact the record blank at approximately the same peripheral position on the latter. The advance ball should ride upon the uncut portion of the record blank and generally as close to the stylus as practicable.

The mounting of the advance ball arm in the suspension is shown in Fig. 3. The lever 13 is provided with a cylindrical bore 15 parallel to the axis of shaft 16, and a communicating opening 17 is cut in the lower side of the lever to accommodate the advance ball lever arm 24. The arm 24 is affixed to a journal generally indicated at 19 which rotates within the bore 15. The journal comprises two race members 21 which are fastened together as a unit with a sleeve 23 coaxially supported between them. The journal is centered within the bore by means of conical end bearings 25 and bearing balls 27 which fit between the races 21 and bearings 25. The sleeve 23 is slightly smaller in diameter than the bore 15, but the balls 27 keep the sleeve centered within the bore so that clearance from the bore is maintained all around the sleeve. This clearance is filled with a lubricant of the viscosity necessary to give to the advance ball a proper resistance for damping the resonance of the suspension.

A suitable resistance for the advance ball may be determined by analysis of the mechanical system formed by the suspension and of the electrical system which is analogous thereto. The mechanical system of the suspension of Figs. 1–3 is illustrated in Fig. 4. A mass M is shown connected to a force F through a compliance C and a dissipative resistance *r*. M is the effective mass at the stylus tip which responds to forces imposed thereon by the record. The magnitude of M is affected by the configuration of the entire suspension and so is best determined experimentally. This mass is coupled to the record through a compliance C at the stylus tip and through a dissipative resistance *r* which has its origin in the bearing 26. The force F is the vertical force experienced by the stylus in consequence of the cutting process upon a change in the level of the record surface at the stylus.

The compliance C is the ratio of the vertical displacement of the stylus relative to the record surface, such as occurs with a change in cutting depth, to the force F generated upon such change in cutting depth.

The resistance *r* is the ratio of the force applied to the advance ball to the resulting velocity of the advance ball relative to the stylus. The advance ball moves through such small angles about the bearing 26 that its motion is approximately rectilinear.

It should be understood that while the physical basis for the resistance *r* is friction at the bearing 26, *r* is defined with reference to the advance ball since that is the point at which irregularities in the record surface will impose motions on the lever arm with consequent dissipation in the bearing. The weight 36 does not appear in the diagram of Fig. 4 since it plays no part in determining the motion of the mass M. It simply provides, ideally, a rigid coupling between the advance ball and the record surface for the transmission to the bearing 26 of the motion developed between the record and the suspension during the cutting process.

The value of *r* may be determined by holding the cutting head stationary and allowing the advance ball to fall in the gravitational field. *r* is given as the ratio of the gravitational force (weight 36) acting between the advanced ball and the stylus to the steady state velocity of the advance ball when so falling.

The effective mass M at the stylus tip may be determined by suspending the cutter float 2 from a spring of known compliance. With the float in a position to oscillate freely on the shaft 16 when coupled to such a spring the resonant frequency of the system including the suspension and spring can be directly measured, and from this frequency the value of M can be computed. In an embodiment of the invention according to Figs. 1–3 which has been successfully operated, M was of the value 920 grams. With a knowledge of M, the compliance C of the suspension while cutting a record can be determined by removing the advance ball or by holding it out of contact with the record and observing the resonant or "bounce" frequency of the suspension in operation. The frequency can for example be determined from the spacing of changes in groove depth which appear in a record cut with the advance ball so disabled. The compliance C is then given by the reciprocal of the product of M and the square of the angular velocity of the oscillations whose frequency is so observed. In the example above referred to the compliance with lacquer records of the type customarily employed in making master records had the value 0.115 time $10^{-6}$ centimeters per dyne.

In such a system critical damping exists when the damping resistance $r$ is equal to the square root of $$\frac{4M}{C}$$

In the example being described $r$ should therefore ideally possess a value of 1.79 times $10^5$ dyne seconds per centimeter. By suitable selection of the lubricant at the bearing 26 the resistance of the advance ball to motion relative to the float (this motion being approximately linear over the small excursions encountered) may be brought to the desired value.

It is not necessary, however, to employ critical damping, and a mechanical resistance $r$ lower than that called for by the relation.

$$r^2=\frac{4M}{C}$$

is often satisfactory in practice.

The location of the bearing 26 between the shaft 16 and the stylus is not critical. Whatever the position of the bearing 26 along lever arm 13, its resistance will, as to high frequency variations, constrain the float to follow the record surface and as to low frequency variations permit the stylus to adjust to the desired depth despite differences in record surface level between the advance ball and stylus contact points. It will also damp out oscillations undertaken by the float in response to suitably spaced stresses applied to the stylus. However, it is to be noted that the advance ball should be located near the stylus so that the location of the bearing 26 will affect the length of the lever arm 24. As this lever arm is lengthened the friction in the bearing 26 must be increased to maintain the resistance $r$ at the advance ball at a desired value.

The plausibility of the above analysis is confirmed by reference to Fig. 5 in which the mechanical system of Fig. 4 has been replaced by its electrical equivalent. The mass M of Fig. 4 is here shown as an inductance, the compliance C as an electrical capacity, and the dissipative resistance $r$ as an electrical resistance. The mechanical force F appears as an electromotive force supplied by a source connected to the terminals T of the circuit. In the electrical circuit of Fig. 5, as in the mechanical schematic of Fig. 4, for critical damping $$r^2=\frac{4M}{C}$$

The embodiment which has been described in connection with the drawings is to be understood as merely illustrative of one form which my invention may take. Various changes in the suspension may be made within the scope of my invention. For example the weight 36 of Figs. 1–3 may be replaced by a spring suitably strung between the advance ball arm and the lever arm of the float to which the cutting head is attached. By adjustment of the balance of the float around its horizontal pivot (the shaft 16 in the embodiment of Fig. 1) such a spring can be stressed sufficiently to keep the advance ball at all times in contact with the record while preserving the desired net downward force at the stylus due to gravity. Such a substitution will in general change both the effective mass of the suspension referred to the stylus tip (because of removal of the counterweight) and the total compliance of the float with respect to the record. The compliance of the spring between the advance ball lever arm and float lever will be mechanically in parallel with that between the stylus tip and record groove. This will give a new resonant frequency to the system and call for a changed value of the dissipative resistance $r$. Preferably such a spring should have a much greater compliance than that of the groove being cut.

Or it may be found convenient to substitute for a part or all of the counterweights a spring stressed between the cutting head and the lathe carriage. In this way the moment of inertia of the suspension about its horizontal pivot and hence the mass of the suspension referred to the stylus tip can be very substantially reduced. If such a construction is adopted, care should be taken to insure that the force exerted by the spring so employed does not vary importantly with its elongation suffered in the course of motion of the suspension about its horizontal pivot. In order to give to the spring a reasonably constant force over the operating range, a long spring can be employed or a linkage provided which will alter its radius arm as the suspension moves. Whatever the means employed to couple the advance ball to the record, and whatever additional compliance may exist between the suspension and the record (via the lathe carriage for example as in the case of a spring strung between the suspension and the lathe carriage) the resulting mechanical system will possess a resonance which can be damped by coupling an advance ball between the record and suspension through an element of mechanical resistance.

I claim:

1. A suspension for a phonograph record cutting head head comprising a lever pivoted for rotation about a horizontal axis, a record groove cutting head arranged on the lever, a counterweight arranged on the lever to provide at the cutting head a desired net downward force due to gravity, a bearing in the lever having its axis displaced from and substantially parallel to the axis of rotation of the lever, a lever arm journaled in the bearing, an advance ball arranged on the lever arm for engagement with the surface of a record disk being cut, a weight on the lever arm in the vicinity of the advance ball, and a viscous lubricant applied at the bearing.

2. A suspension for a phonograph record cutting head comprising a lever pivoted for rotation about a horizontal axis, a record groove cutting head arranged on the lever, a counterweight arranged on the lever to provide at the cutting head a net downward force due to gravity, a bearing in the lever having its axis substantially parallel to and laterally displaced from the axis of rotation of the lever, a cylindrical chamber in the lever coaxial with the bearing, a lever arm including a journal adapted to ride in the bearing, a sleeve affixed to the lever arm coaxially with the journal and adapted to rotate coaxially within the cylindrical chamber, an advance ball arranged on the lever arm for engagement with the surface of a record disk being cut, a weight on the lever arm in the vicinity of the advance ball, and a viscous lubricant applied between the sleeve and inner surface of the cylindrical chamber.

3. A suspension for a phonograph record cutting head comprising a lever pivoted for rotation about a horizontal axis, a record groove cutting head arranged on the lever at an end thereof remote from said axis, a bearing in the lever adjacent the cutting head, a lever arm journaled in the bearing, an advance ball arranged on the lever arm for engagement with the surface of a record disk being cut, a weight on the lever arm in the vicinity of the advance ball, and a viscous lubricant applied at the bearing.

4. A suspension for a phonograph record cutting head comprising a lever pivoted for rotation about a horizontal axis, a record groove cutting head arranged on the lever at an end thereof remote from said axis, a bearing in the lever adjacent the cutting head, a cylindrical chamber in the lever coaxial with the bearing, a lever arm including a journal adapted to ride in the bearing, a cylindrical member affixed to the lever arm coaxially with the journal and adapted to rotate within the cylindrical chamber with small clearance therefrom, an advance ball arranged on the lever arm for engagement with the surface of a record disk being cut, means to maintain the advance ball in contact with the record independently of the position of the lever, and a viscous fluid filling the clearance between the cylindrical member and the inner surface of the chamber.

References Cited in the file of this patent

UNITED STATES PATENTS

| | | |
|---|---|---|
| 1,661,539 | Maxfield | Mar. 6, 1928 |
| 1,874,101 | Head | Aug. 30, 1932 |
| 1,946,581 | Head | Feb. 13, 1934 |
| 2,242,927 | Somers | May 20, 1941 |
| 2,528,826 | Hanson et al. | Nov. 7, 1950 |
| 2,551,506 | Rockwell | May 1, 1951 |